United States Patent [19]
Nakano et al.

[11] Patent Number: 6,108,293
[45] Date of Patent: Aug. 22, 2000

[54] GAIN CONTROL OF A REPRODUCED SIGNAL AMPLIFIER FOR PRECISE MONITORING OF A REPRODUCED SIGNAL DURING RECORDING

[75] Inventors: Masaki Nakano; Toshiaki Iwanaga, both of Tokyo, Japan

[73] Assignee: NEC Corporation, Tokyo, Japan

[21] Appl. No.: 09/156,664

[22] Filed: Sep. 18, 1998

[30] Foreign Application Priority Data

Sep. 19, 1997 [JP] Japan .................................... 9-273923

[51] Int. Cl.[7] ........................................................ G11B 7/00
[52] U.S. Cl. ................... 369/124.1; 369/107; 369/44.32; 369/124.12
[58] Field of Search ............................ 369/124.1, 59, 369/106, 44.41, 49, 116, 118, 110, 121, 109, 122, 124.12, 107, 44.32; 250/201, 205; 372/29, 25

[56] References Cited

U.S. PATENT DOCUMENTS

| | | | |
|---|---|---|---|
| 4,378,490 | 3/1983 | d'Auria Luigi | 250/201 |
| 5,193,083 | 3/1993 | Yanagawa | 369/116 |
| 5,228,063 | 7/1993 | Zucker | 369/49 |
| 5,570,335 | 10/1996 | Ogata et al. | 369/124 |

FOREIGN PATENT DOCUMENTS

| | | | |
|---|---|---|---|
| 2-143931 | 6/1990 | Japan | G11B 7/125 |
| 5-250674 | 9/1993 | Japan | G11B 7/00 |
| 6-168473 | 6/1994 | Japan | G11B 7/125 |

*Primary Examiner*—Tan Dinh
*Assistant Examiner*—Kim-Kwok Chu
*Attorney, Agent, or Firm*—Foley & Lardner

[57] ABSTRACT

An optical disk recording device for conducting reading and recording of data through irradiation of laser beam on an optical disk medium comprises a photo detection circuit for receiving input of reflected light from an optical disk medium to detect a reproduced signal, a pre-amplifier for amplifying a reproduced signal from the photo detection circuit and outputting the amplified reproduced signal for monitoring, and a level shift circuit for shifting a level of a reproduced signal from the photo detection circuit increased with an increase of the amount of light in data recording operation to a preset value and outputting the level-shifted reproduced signal to the pre-amplifier.

25 Claims, 9 Drawing Sheets

GAIN CONTROL OF A REPRODUCED SIGNAL AMPLIFIER FOR PRECISE MONITORING OF A REPRODUCED SIGNAL DURING RECORDING

BACKGROUND OF THE INVENTION

1. Field of the Invention

The present invention relates to an optical disk recording device which executes data reproduction and recording from and on an optical disk medium and, more particularly, to an optical disk recording device capable of monitoring of a reproduced signal being recorded even when laser power is increased during data recording.

2. Description of the Related Art

Conventional optical disk recording devices which conduct optical reading and recording of information are provided with a reproduced signal photo detector for detecting reflected light from an optical disk medium in order to monitor a reproduced signal at the time of recorded data reading and at the time of data recording. The optical disk recording devices are also provided with an amplifier for amplifying a reproduced signal read from the optical disk medium because reproduction power at the recorded data reading is lower than recording power. Amplification degree of this amplifier is fixed in general.

In addition, conventional magneto-optical disk recording devices require verification to be conducted after data recording for the purpose of ensuring data reliability because the devices lack in an overwrite function which a magnetic recording device has and because the devices are liable to have a defect such as adsorption of refuse and scratches. Therefore, the devices have a drawback that they are slow in recording operation by a time for waiting for disk rotation. More specifically, the current optical disk recording devices need three steps (time for three rotations of a disk) of data erasing, data recording and verification of recorded data. The magneto-optical disk recording devices conduct verification of recorded data by monitoring a reproduced signal during data recording.

Figure 9:
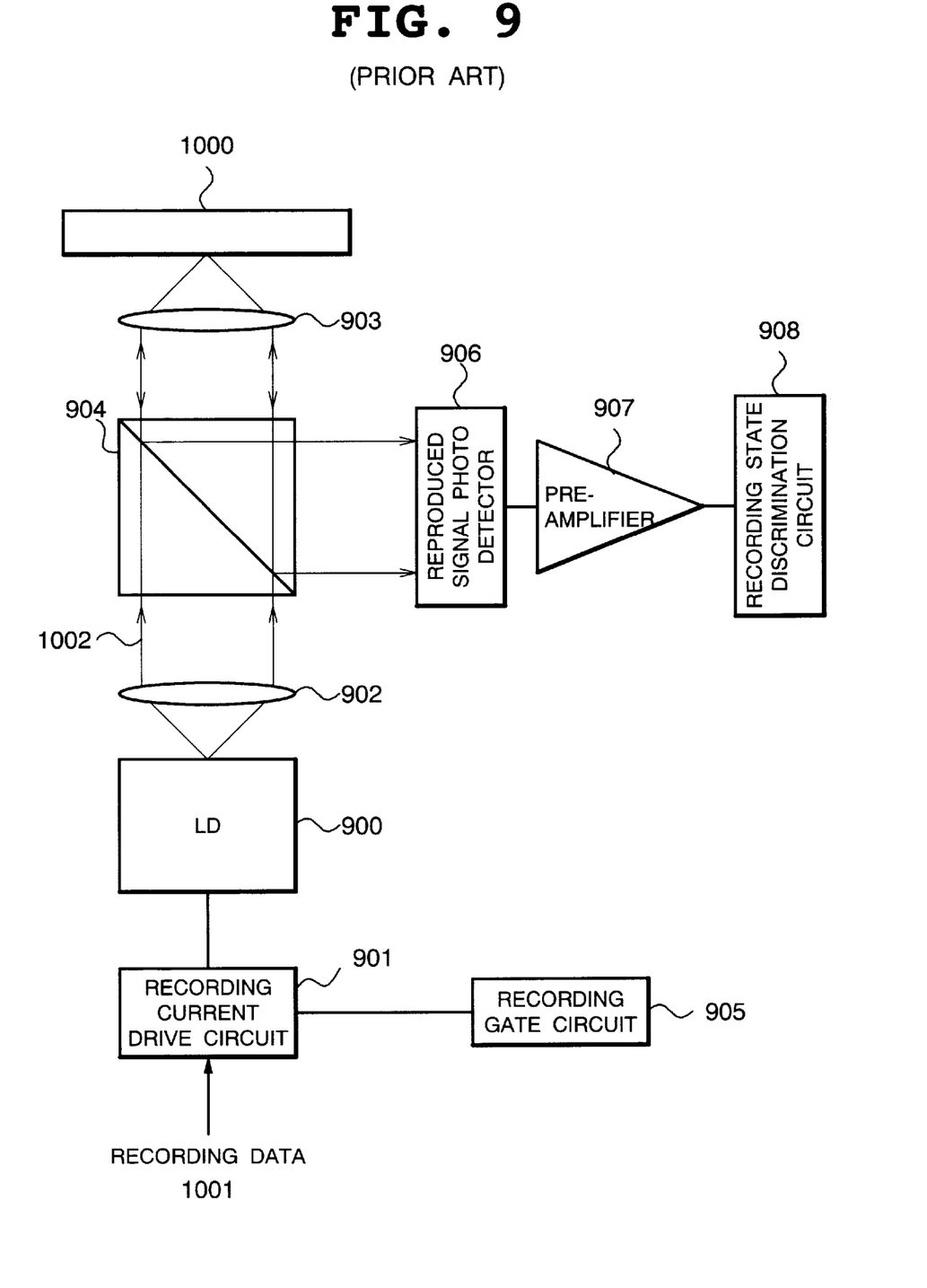
FIG. 9 is a block diagram showing one example of structure of a conventional optical disk recording device.

FIG. 9 shows common structure of a conventional optical disk recording device. In FIG. 9, this optical disk recording device includes a semiconductor laser diode (LD) 900, a recording current drive circuit 901 for supplying the semiconductor laser diode 900 with a recording current, a convergent lens 902, an objective lens 903, a half prism 904, a recording gate circuit 905, a reproduced signal photo detector 906 as an optical information detector, a pre-amplifier 907 and a recording state discrimination circuit 908. 100 denotes an optical disk medium, 1001 recording data and 1002 recording beam.

The recording beam 1002 from the semiconductor laser diode (LD) 900 is irradiated onto the optical disk medium 1000 and the reflected light is detected to read data. In data recording, the recording gate circuit 905 enters an ON state to apply a recording gate signal to the recording current drive circuit 901, so that power of the recording beam 1002 from the semiconductor laser diode (LD) 900 is increased.

As described in the foregoing, the conventional optical disk recording devices have a constant amplification degree of an amplifier which amplifies a reproduced signal from a reproduced signal photo detector and are therefore provided with no function of controlling an amplification degree of the amplifier such that a reproduced signal output from the reproduced signal photo detector during data reading and a reproduced signal during recording when the amount of incident light is increased have a predetermined level. As a result, if laser power increases at the data recording when the recording gate circuit enters the ON state, as the amount of light incident on the reproduced signal photo detector is increased, a reproduced signal from the reproduced signal photo detector is increased. Then, when the reproduced signal from the reproduced signal photo detector is amplified at the amplifier, saturation of a reproduced output signal will occur. In this case, there arises a problem at an on-recording verification device which conducts recording verification by using a reproduced signal being recorded that precise monitoring of a reproduced signal being recorded is impossible.

In conventional optical disk recording devices which conduct no recording verification, no consideration is given to a means for switching an amplification degree of a reproduced signal output circuit of a photo detector because monitoring of a reproduced signal being recorded when a recording gate circuit enters the ON state to increase laser power is unnecessary.

Conventional built-in amplifier reproduced signal photo detector which is provided with no means for controlling an amplification degree of an amplifier for a signal with a large input amplitude has a shortcoming that another reproduced signal photo detector as a countermeasure against saturation of a reproduced signal should be prepared, which can not be coped with addition of inexpensive and simple components.

For changing an amplification degree of an amplifier when light power is changed at an optical disk recording device, conventionally employed is a method of providing an AGC (automatic gain control) circuit within a servo loop in order to obtain stable servo operation at the time when laser power for data recording becomes higher than that of the reproduction, thereby correcting a loop gain so as not to be changed even with a change of the amount of reflected light from an optical disk due to a change of the laser power or a change of a reflectance of the optical disk. Conventional AGC circuits, however, make an output constant by feeding back an unsaturated input signal and therefore can not be employed without modification as a technique of amplifying a reproduced signal according to the size of a reproduced signal at the data reading and the size of an increased reproduced signal being recorded within a range in which no saturation of output will occur to catch and monitor a subtle response of the reproduced signal.

SUMMARY OF THE INVENTION

A first object of the present invention is to provide an optical disk recording device capable of precisely monitoring, in on-recording verification of the device, a reproduced signal from a photo detector being recorded even when laser power is increased during the recording.

A second object of the present invention is to provide an optical disk recording device allowing saturation of a reproduced signal at a conventional built-in amplifier reproduced signal photo detector to be coped with by the addition of inexpensive and simple components, thereby eliminating the need of another reproduced signal photo detector.

According to the first aspect of the invention, an optical disk recording device for conducting reading and recording of data through irradiation of laser beam on an optical disk medium, comprises photodetection means for receiving input of reflected light from the optical disk medium to detect a reproduced signal, amplification means for amplifying a reproduced signal from the photo detection means and outputting the amplified reproduced signal for monitoring, and level shift means for shifting a level of a direct current component of a reproduced signal from the photo detection means increased with an increase of the light amount in data recording operation down to a preset value and outputting the level-shifted reproduced signal to the amplification means.

In the preferred construction, the optical disk recording device further comprises recording gate means for outputting a recording gate signal indicative of on-recording of data, wherein the level shift means conducts level-shifting operation upon receiving input of a recording gate signal from the recording gate means.

In another preferred construction, the level shift means shifts a level of a direct current component of the reproduced signal down to a value at which no saturation of the reproduced signal having been amplified by the amplification means will occur.

In another preferred construction, the optical disk recording device further comprises recording gate means for outputting a recording gate signal indicative of on-recording of data, wherein the level shift means is constituted by a shunt circuit which is turned on/off in response to a recording gate signal at data recording, and shunts a reproduced signal from the photo detection means by means of the shunt circuit to shift a level of a direct current component of the reproduced signal.

In another preferred construction, the shunt circuit is composed of an FET having a drain connected to the output of the photo detection means and the input of the amplification means and a gate connected to the recording gate circuit, and a resistor for dividing a voltage.

In another preferred construction, the FET is a J-FET or a MOS-FET.

In another preferred construction, the shunt circuit is constituted by a current mirror circuit composed of a first transistor having a collector and a base connected with each other and the collector connected to the recording gate circuit and a second transistor having a collector connected to the output of the photo detection means and the input of the amplification means.

Also, the amplification means is built in the photo detection means.

According to the second aspect of the invention, an optical disk recording device for conducting reading and recording of data through irradiation of laser beam on an optical disk medium, comprises photodetection means for receiving input of reflected light from the optical disk medium to detect a reproduced signal, amplification means for amplifying a reproduced signal from the photo detection means and outputting the amplified reproduced signal for monitoring, an amplification degree switching circuit for receiving a recording gate signal at information recording as input, and gain control means for shifting a gain of a signal amplitude of a reproduced signal from the photo detection means increased with an increase of the light amount in data recording operation down to a preset value and outputting the gain-shifted reproduced signal to the amplification means.

In the above-mentioned construction, the gain control means shifts a gain of a signal amplitude of the reproduced signal down to a value at which no saturation of the reproduced signal having been amplified by the amplification means will occur.

In the preferred construction, the optical disk recording device further comprises recording gate means for outputting a recording gate signal indicative of on-recording of data, wherein the gain control means conducts gain-shifting operation upon receiving input of a recording gate signal from the recording gate means.

According to the third aspect of the invention, an optical disk recording device for conducting reading and recording of data through irradiation of laser beam on an optical disk medium, comprises photodetection means for receiving input of reflected light from the optical disk medium to detect a reproduced signal, amplification means for amplifying a reproduced signal from the photo detection means and outputting the amplified reproduced signal for monitoring, an amplification degree switching circuit for receiving a recording gate signal at information recording as input, and subtraction means for subtracting, from a direct current component of a reproduced signal from the photo detection means increased with an increase of the light amount in data recording operation, a part of the direct current component proportional to the increase in the light amount to lower the level.

In the preferred construction, the subtraction means subtracts an increased part of the direct current component of the reproduced signal until having a value at which no saturation of the reproduced signal having been amplified by the amplification means will occur.

In another preferred construction, the optical disk recording device further comprises recording gate means for outputting a recording gate signal indicative of on-recording of data, wherein the subtraction means conducts subtraction processing upon receiving input of a recording gate signal from the recording gate means.

According to another aspect of the invention, an optical disk recording device for conducting reading and recording of data through irradiation of laser beam on an optical disk medium, comprises photodetection means for receiving input of reflected light from the optical disk medium to detect a reproduced signal, amplification means for amplifying a reproduced signal from the photo detection means and outputting the amplified reproduced signal for monitoring, an amplification degree switching circuit for receiving a recording gate signal at information recording as input, and light attenuation means for attenuating the amount of light input to the photo detection means for lowering a level of a reproduced signal from the photo detection means increased with an increase of the light amount in data recording operation.

In the preferred construction, the light attenuation means attenuates the amount of light input to the photo detection means down to a value at which no saturation of the reproduced signal having been amplified by the amplification means will occur.

In another preferred construction, the optical disk recording device further comprises recording gate means for outputting a recording gate signal indicative of on-recording of data, wherein the light attenuation means attenuates the light amount upon receiving input of a recording gate signal from the recording gate means.

In another preferred construction, the light attenuation means is constituted by a liquid crystal element or an electronic shutter element.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In a case of an optical disk recording device, an optical disk medium is irradiated for recording with converging beam which moves at a certain rate relative to the optical disk medium. On this occasion, a signal read from the optical disk medium within a region irradiated with the converging beam for recording is constantly read by a photo detector even when recording power is irradiated. For precise monitoring of a reproduced signal being recorded at the data recording, the embodiments of the present invention control a photo current signal from a reproduced signal photo detector which is to be applied to a pre-amplifier such that no saturation of output of the pre-amplifier will occur which amplifies a photo current output from the reproduced signal photo detector, thereby precisely monitoring a reproduced waveform being recorded.

In the following embodiments, description will be made of a case where a pre-amplifier (DC amplifier) is used as an amplifier of the present invention.

Figure 1:
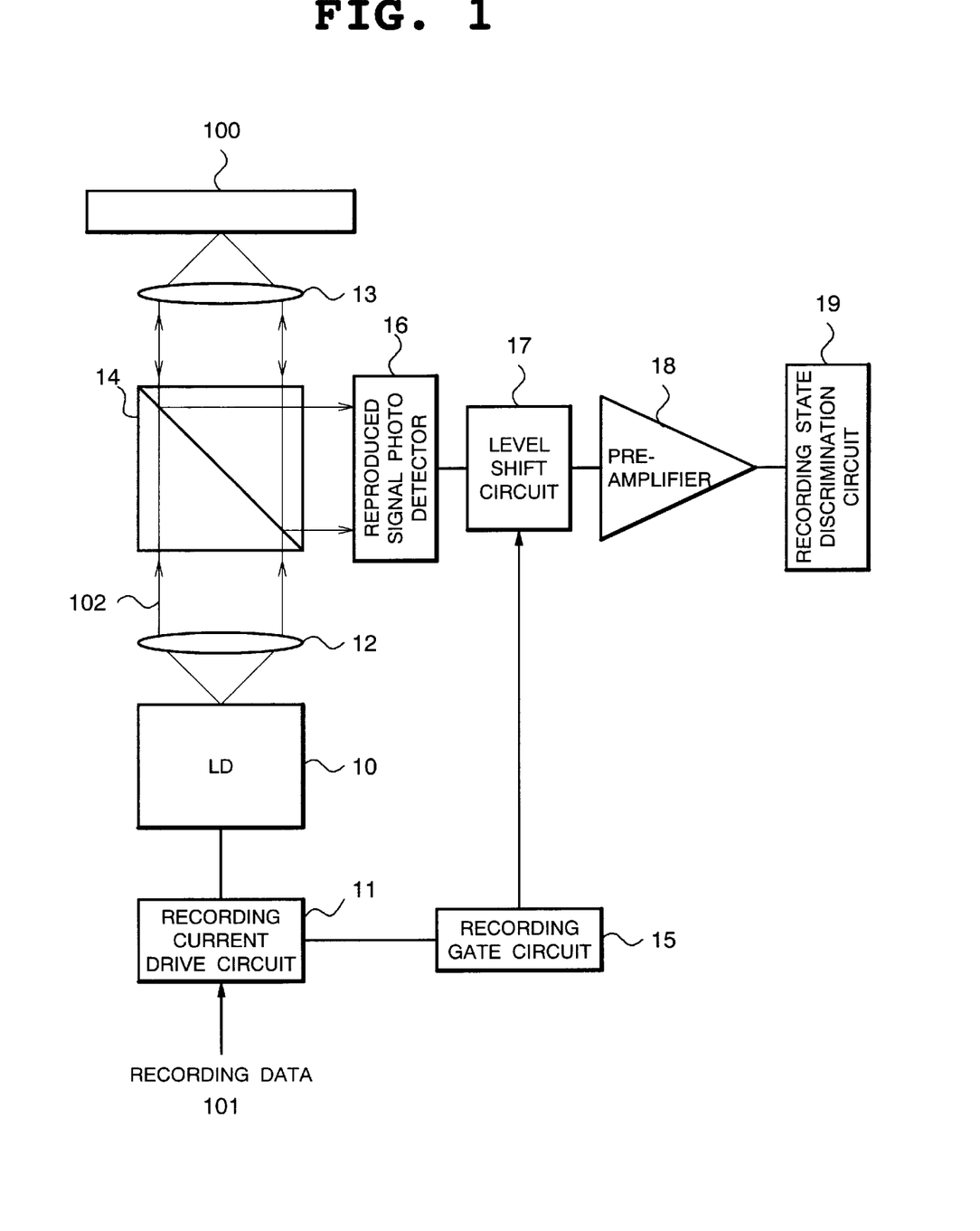
FIG. 1 is a block diagram showing structure of a first embodiment of an optical disk recording device according to the present invention.

FIG. 1 is a block diagram showing structure of a first embodiment of an optical disk recording device to which an optical information detection device of the present invention is applied.

In FIG. 1, the optical disk recording device includes a semiconductor laser diode (LD) 10, a recording current drive circuit 11 for supplying the semiconductor laser diode 10 with a recording current, a convergent lens 12, an objective lens 13, a half prism 14, a recording gate circuit 15, a reproduced signal photo detector 16 as an optical information detector, a level shift circuit 17, a pre-amplifier 18, and a recording state discrimination circuit 19. 101 denotes recording data and 102 denotes recording beam.

In the above-described structure, the recording data 101 is recorded on the optical disk medium 100 by converging the recording beam 102 output from the semiconductor laser diode 10 by the recording current drive circuit 11 by means of the objective lens 13. Part of the recording beam 102 is constantly incident on the reproduced signal photo detector 16 through the half prism 14.

For recording and reproduction, the common one-beam reproduced signal photo detector 16 is employed. Shown here is a case of recording on a track N. The recording gate circuit 15 enters the ON state to output a recording gate signal indicative of on-recording, so that the recording data 101 is recorded on the optical disk medium 100 by means of the recording beam 102 through the recording current drive circuit 11.

At the same time, during recording operation, although the amount of light incident on the reproduced signal photo detector 16 is increased with the increase in the amount of the light from the semiconductor laser diode 10 caused by the control of the recording current drive circuit 11 by the recording gate signal from the recording gate circuit 15, in response to the application of the recording gate signal of the recording gate circuit 15, a DC (direct current output component) level of a photo current of the reproduced signal photo detector 16 is shifted by the level shift circuit 17 to a value at which no saturation of output of the pre-amplifier 18 will occur. The level-shift value of a direct current output component by the level shift circuit 17 is set in advance taking an amplification degree of the pre-amplifier 18 into consideration.

Structuring the level shift circuit 17 as a shunt of a photo current from an anode terminal of the reproduced signal photo detector 16 enables level shift of an output signal of the reproduced signal photo detector 16. This serves to monitor magneto-optical information light being recorded and output the same to the recording state discrimination circuit 19.

For dividing the flow of the photo current, a cathode terminal of the reproduced signal photo detector 16 can be also used. The present invention is also applicable to a signal detection system employing a change of the light amount such as a phase change medium or a write once type optical disk.

As described in the foregoing, being structured to include the level shift circuit 17 to shift a level of an output direct current component of the reproduced signal photo detector 16 to a preset value when laser power is increased while the recording gate circuit 15 is at the ON state, the present embodiment is allowed to precisely detect a reproduced signal output from the reproduced signal photo detector.

Figure 2:
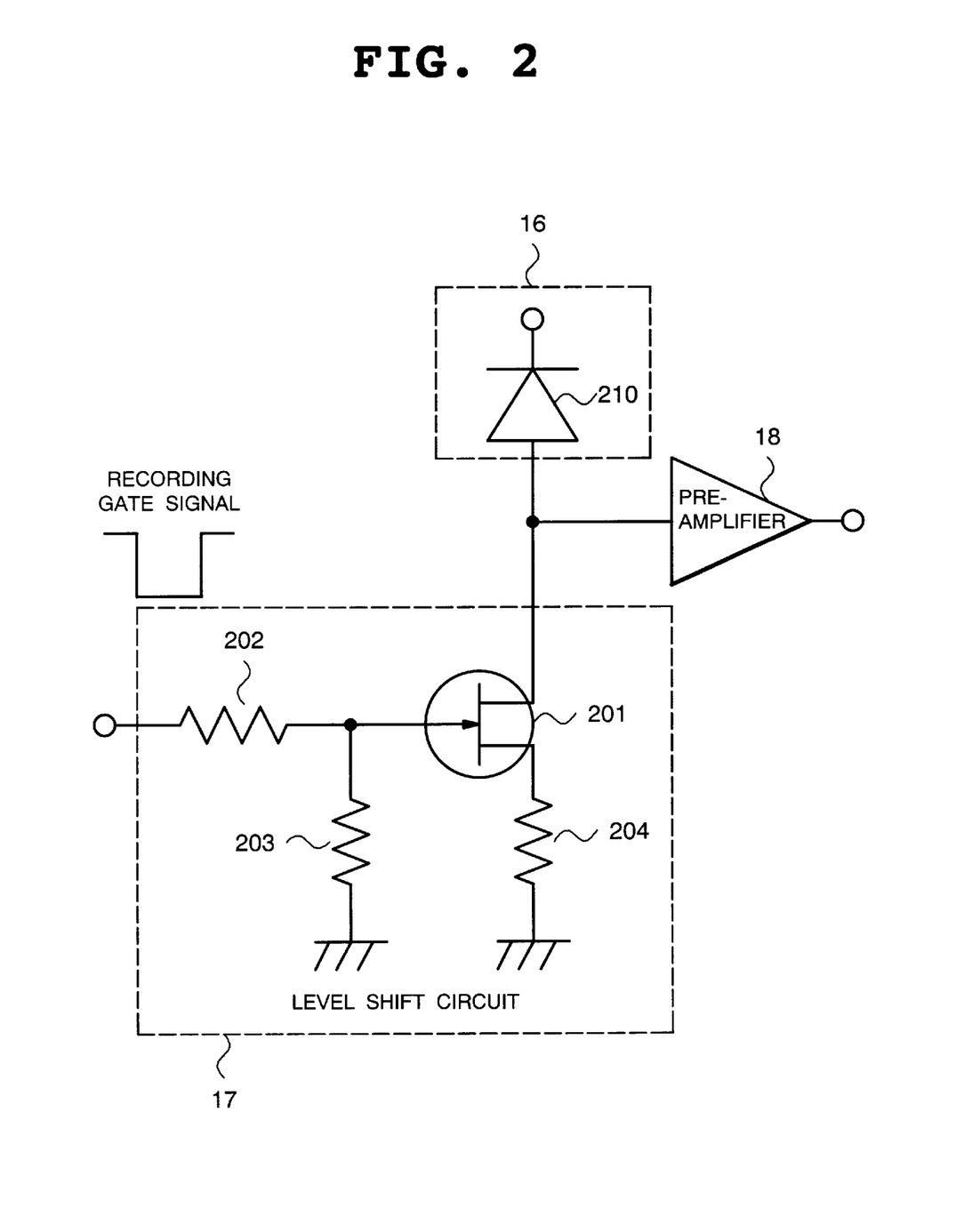
FIG. 2 is a diagram showing one example of structure of a level shift circuit in the first embodiment of the present invention.

FIG. 2 is a diagram showing circuit structure in which a Junction-FET (J-FET) is used for the level shift circuit 17 for an output signal from the reproduced signal photo detector 16 for a reproduced signal in one embodiment of the present invention. The level shift circuit 17 is composed of a J-FET 201 and resistors 202 to 204.

The J-FET 201 has a drain connected to an anode terminal of a photo-diode (PD) 210 constituting the reproduced signal photo detector 16 and an input terminal of the pre-amplifier 18, a gate of the J-FET 201 to which a voltage obtained by dividing a voltage of a signal (Gate) from the recording gate circuit 15 by the resistors 202 and 203 is applied, and a source grounded through the resistor 204.

During recording operation, while the amount of incident light on the photo-diode (PD) 210 is increased, when the recording gate circuit 15 enters the ON state to apply a recording gate signal, the level shift circuit 17 using the J-FET 201 shunts a photo current from the photo-diode (PD) 210, resulting in shifting a direct current component of the photo current to a preset value (value at which no saturation of output of the pre-amplifier 18 occurs) and outputting the level-shifted signal to the pre-amplifier 18. This prevents saturation of output of the pre-amplifier 18 to enable the recording state discrimination circuit 19 to precisely detect a reproduced signal being recorded.

Figure 3:
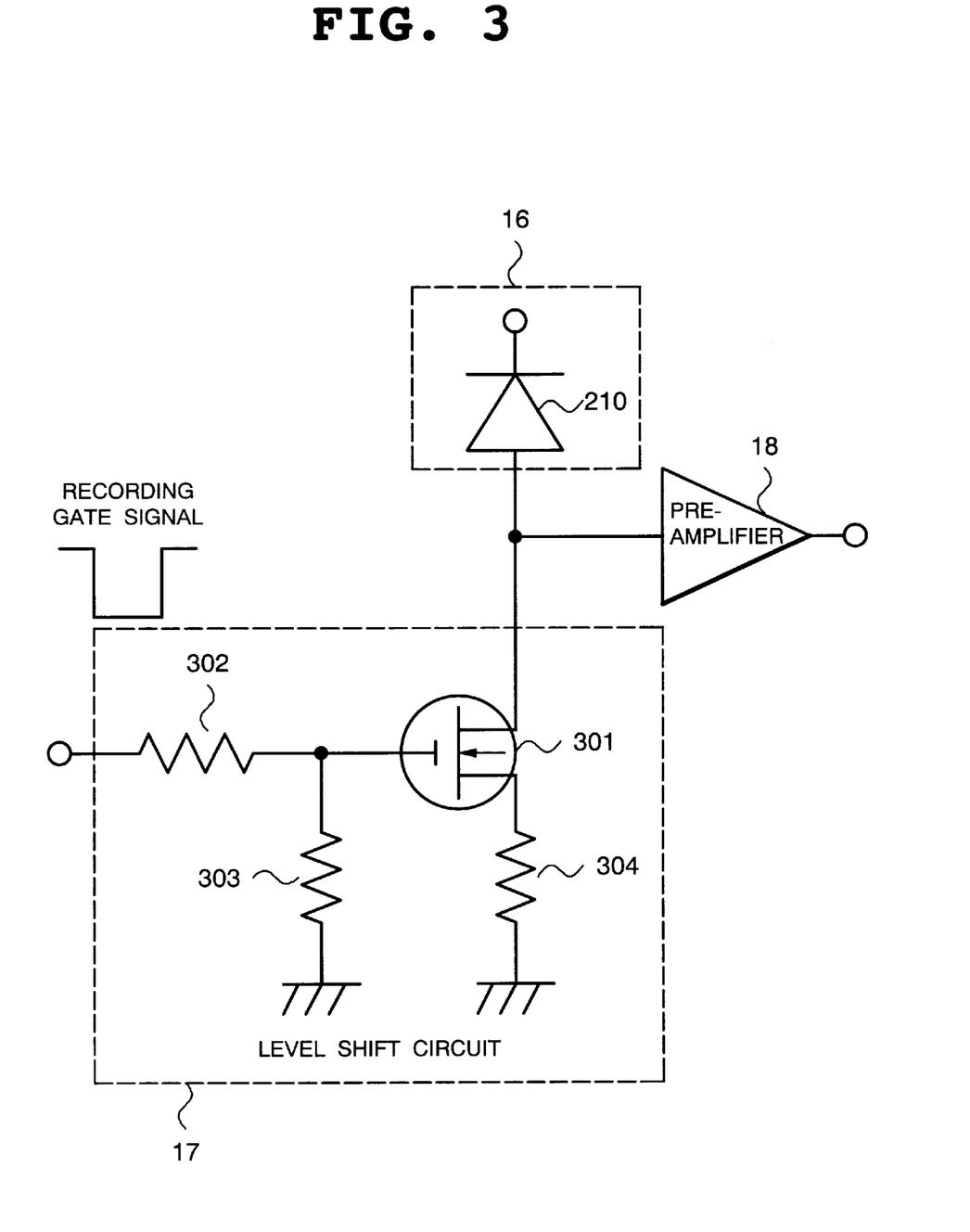
FIG. 3 is a diagram showing another structure of a level shift circuit in the first embodiment of the present invention.

FIG. 3 is a diagram showing structure of a photo information detection device using a MOS-FET as another example of the level shift circuit 17 for an output signal from the reproduced signal photo detector 16 for a reproduced signal in one embodiment of the present invention. The level shift circuit 17 is composed of a MOS-FET 301 and resistors 302 to 304.

The MOS-FET 301 has a drain connected to an anode terminal of the photo-diode (PD) 210 which is the reproduced signal photo detector 16 for a reproduced signal and an input terminal of the pre-amplifier 18, a gate to which a voltage obtained by dividing a voltage of a signal (Gate) from the recording gate circuit 15 by the resistors 302 and 303 is applied, and a source grounded through the resistor 304.

During recording operation, while the amount of incident light onto the photo-diode (PD) 210 is increased, when the recording gate circuit 15 enters the ON state to apply a recording gate signal, the level shift circuit 17 using the MOS-FET 301 shunts a photo current from the photo-diode (PD) 210, resulting in shifting a DC level of an output to the pre-amplifier 18 to an extent that no saturation of output of the pre-amplifier 18 will occur. This prevents saturation of the output of the pre-amplifier 18 to enable precise detection of a reproduced signal being recorded.

Figure 4:
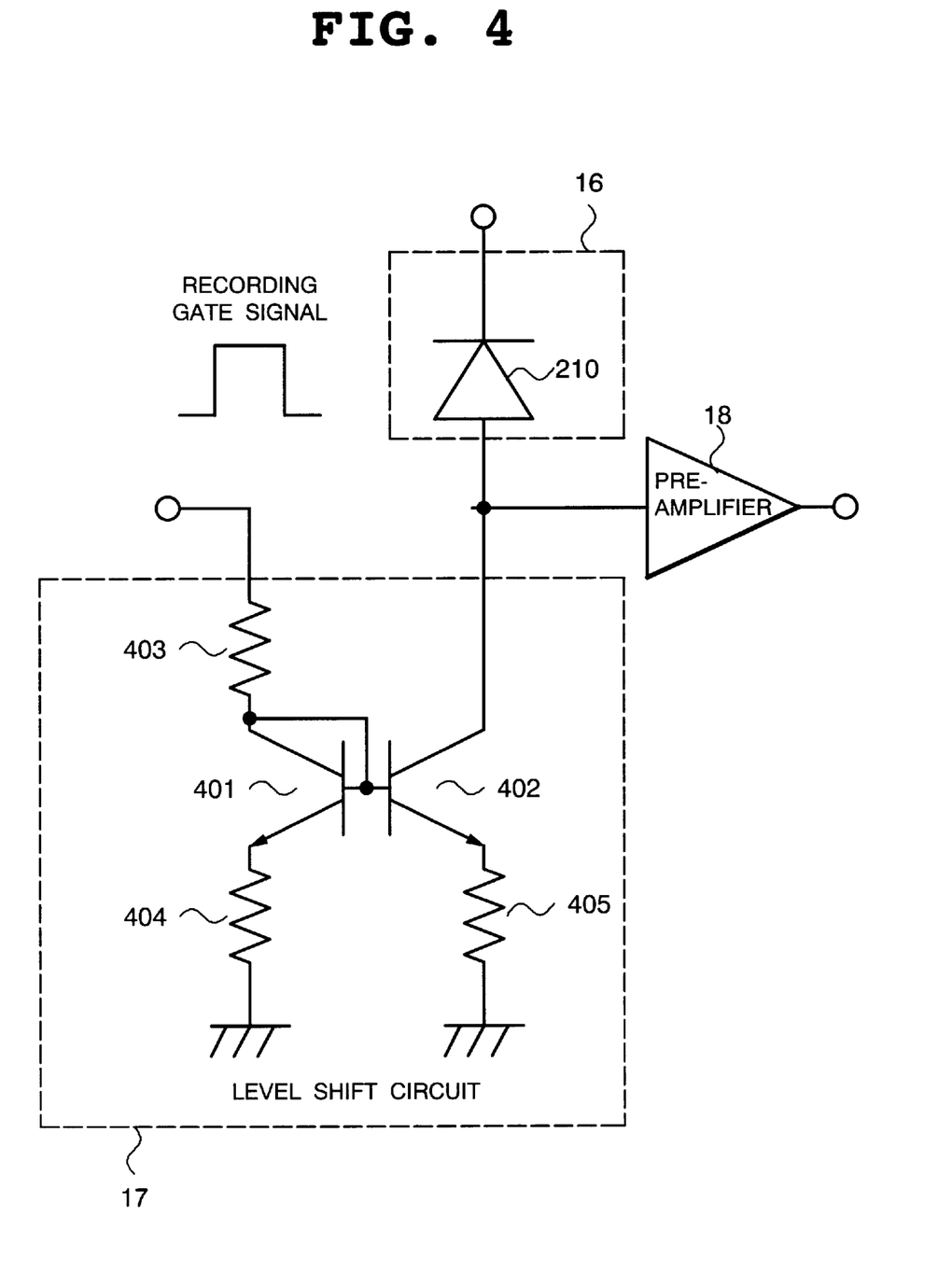
FIG. 4 is a diagram showing further structure of a level shift circuit in the first embodiment of the present invention.

FIG. 4 is a diagram showing further circuit structure in which a current mirror circuit is used as the level shift circuit 17 for an output signal from the reproduced signal photo detector 16 in one embodiment of the present invention.

The level shift circuit 17 is constituted by a current mirror circuit including a transistor 401 having a gate signal (Gate) connected to a collector through a resistor 403 and the collector and a base connected to each other, and a transistor 402 having a base connected to that of the transistor 401 and a collector connected to the anode terminal of the photo-diode (PD) 210 and the input terminal of the pre-amplifier 18.

During recording operation, while the amount of incident light on the photo-diode (PD) 210 is increased, when the recording gate circuit 15 enters the ON state to apply a recording gate signal, the level shift circuit 17 shunts a photo current from the photo-diode (PD) 210, resulting in shifting a DC level of an output to the pre-amplifier 18 to a value at which no saturation of the output of the pre-amplifier 18 occurs. This prevents saturation of the output of the pre-amplifier 18 to enable precise detection of a reproduced signal being recorded.

Figure 5:
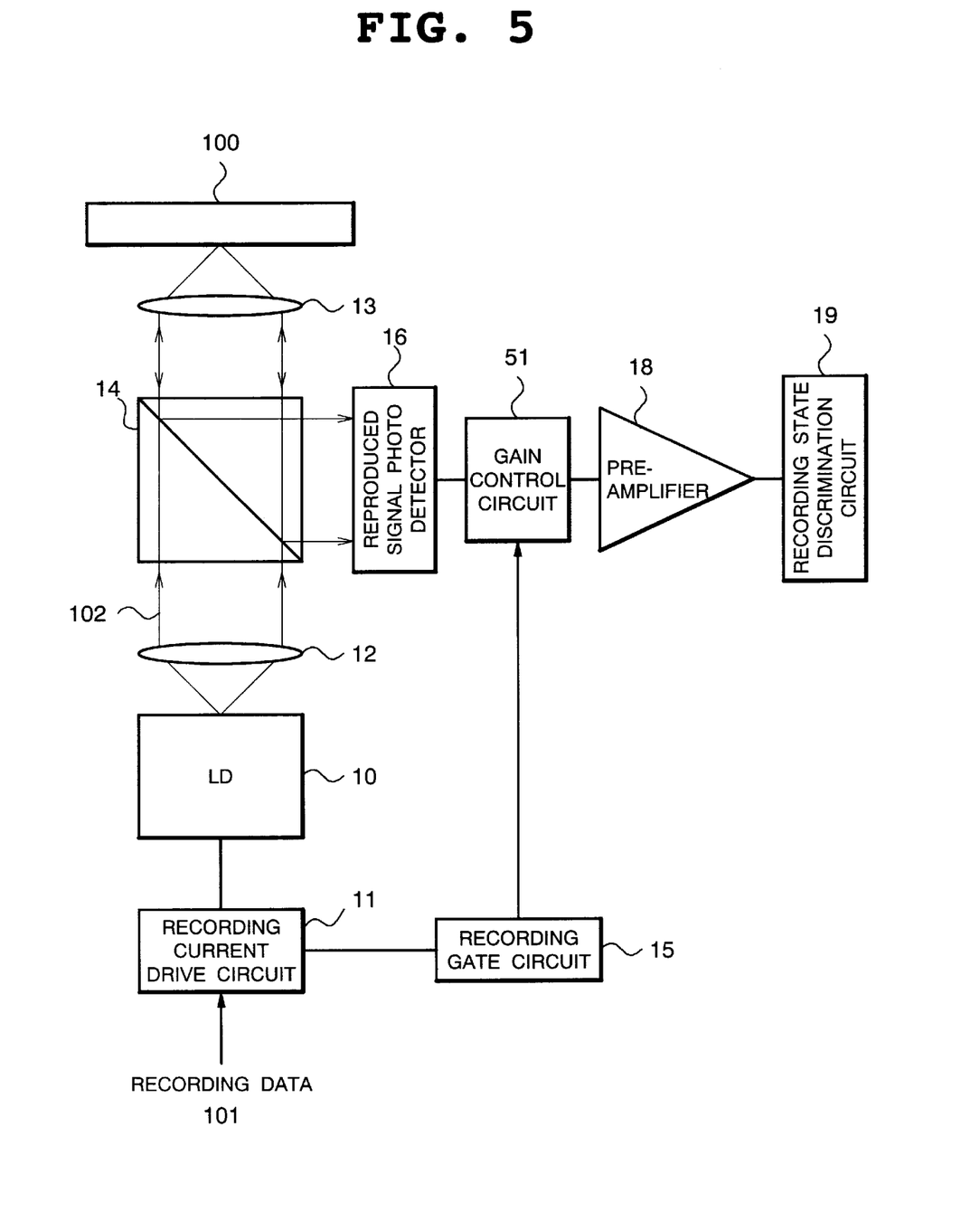
FIG. 5 is a block diagram showing structure of a second embodiment of an optical disk recording device according to the present invention.

FIG. 5 is a block diagram showing structure of a second embodiment of an optical disk recording device to which the optical information detection device of the present invention is applied.

In FIG. 5, the optical disk recording device is structured to have, in the first embodiment shown in FIG. 1, a gain control circuit 51 added to the pre-amplifier 18, which circuit is responsive to the application of a recording gate signal for conducting control to reduce an amplitude of a photo current from the reproduced signal photo detector 16 which is to be applied to the pre-amplifier 18 so as to prevent saturation of output of the pre-amplifier 18. In FIG. 5, a component assigned a reference numeral common to that of the embodiment shown in FIG. 1 represents the same component as its counterpart in the embodiment of FIG. 1. During recording on the optical disk medium 100, the gain control circuit 51 shifts a gain of the amplitude of a photo current signal containing a direct current component from the reproduced signal photo detector 16 to output to the pre-amplifier 18. More specifically, during the recording when output from the reproduced signal photo detector 16 is increased, the gain control circuit 51 conducts control to prevent saturation of the output of the pre-amplifier 18 by reducing an amplitude of a photo current from the reproduced signal photo detector 16 which is to be applied to the pre-amplifier 18. The amount of gain-shift of the amplitude by the gain control circuit 51 is set in advance taking an amplification degree of the pre-amplifier 18 into consideration.

During recording operation, while the amount of incident light on the reproduced signal photo detector 16 is increased, when the recording gate circuit 15 enters the ON state to output a recording gate signal, the gain control circuit 51, in response to the application of the recording gate signal, reduces an amplitude of a photo current signal from the reproduced signal photo detector 16 by gain-shift, thereby adjusting the level of an output of the pre-amplifier 18 so as to avoid saturation of the output of the pre-amplifier 18. This prevents saturation of the output of the pre-amplifier 18 to enable precise detection of a reproduced signal being recorded.

According to this embodiment, it is possible to sense a reproduced signal being recorded when laser power is increased while a recording gate circuit is open without reduction of a reproduced signal amplitude during reproduction.

Figure 6:
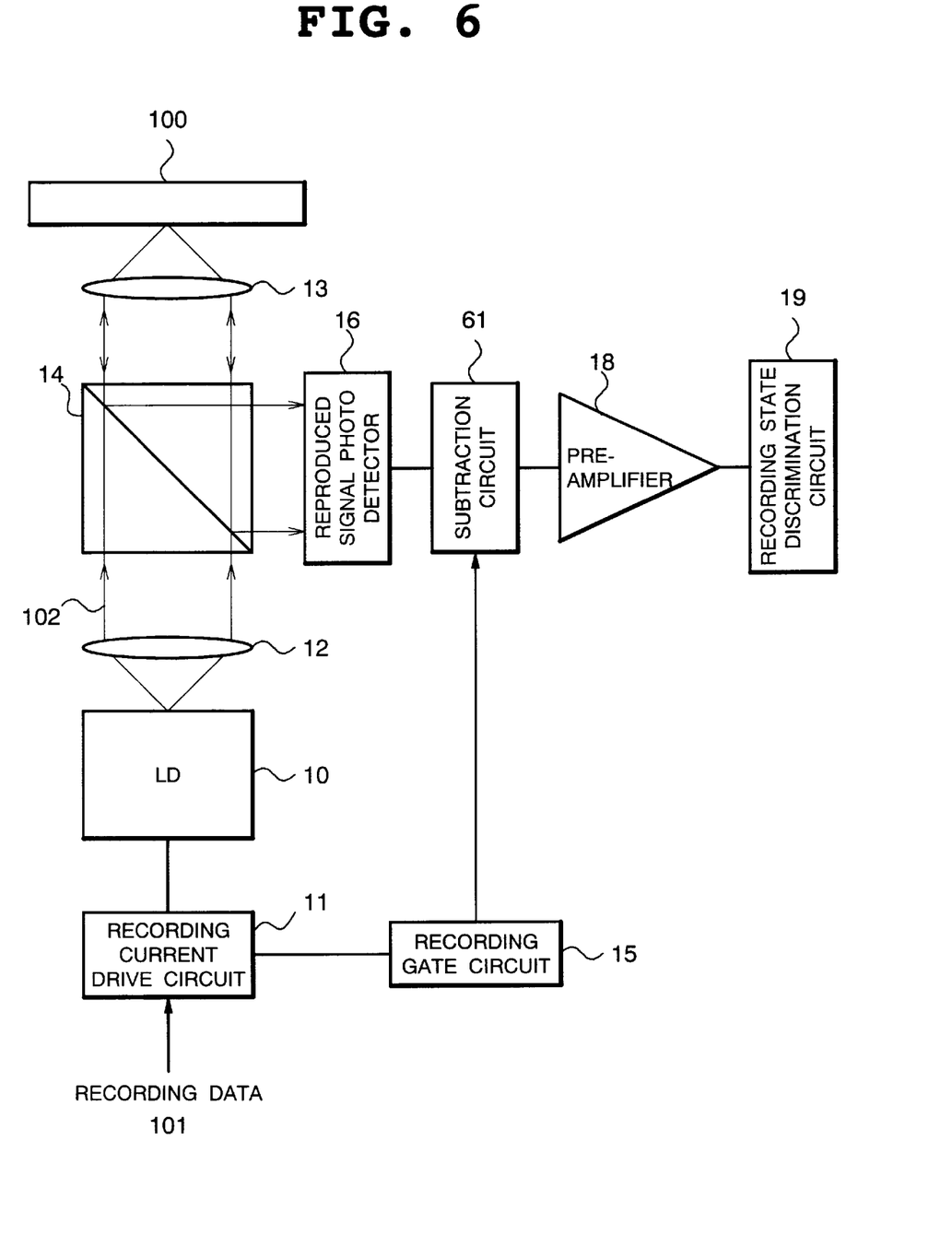
FIG. 6 is a block diagram showing structure of a third embodiment of an optical disk recording device according to the present invention.

FIG. 6 is a block diagram showing structure of a third embodiment of an optical disk recording device to which the optical information detection device of the present invention is applied. In FIG. 6, the optical disk recording device is structured to have, in the first embodiment shown in FIG. 1, a subtraction circuit 61 added to the input of the pre-amplifier 18, which circuit is responsive to the application of a recording gate signal for subtracting a direct current component corresponding to an increase in the amount of incident light from the output of the reproduced signal photo detector 16. In FIG. 6, a component assigned a reference numeral common to that of the embodiment shown in FIG. 1 represents the same component as its counterpart in the embodiment of FIG. 1. The subtraction value of a direct current component by the subtraction circuit 61 is set in advance taking an amplification degree of the pre-amplifier 18 into consideration.

During recording operation, while the amount of incident light on the reproduced signal photo detector 16 is increased, when the recording gate circuit 15 enters the ON state to output a recording gate signal, the subtraction circuit 61, in response to the application of the recording gate signal, subtracts the amount equivalent to a direct current component proportional to the increase in the amount of incident light from the output signal of the reproduced signal photo detector 16 to lower the level of an input to the pre-amplifier 18 so as to prevent saturation of output of the pre-amplifier 18. This prevents saturation of the output of the pre-amplifier 18 to enable precise detection of a reproduced signal being recorded.

As described in the foregoing, provision of the subtraction circuit 61 which makes a level of a reproduced signal output from the reproduced signal photo detector constant allows the present embodiment to eliminate the need of using another photo detector and to make a signal output from the photo detector signal output circuit constant with ease even when laser power is increased while the recording gate circuit is open, thereby suppressing or reducing drastic increase in costs of the optical disk recording device.

Figure 7:
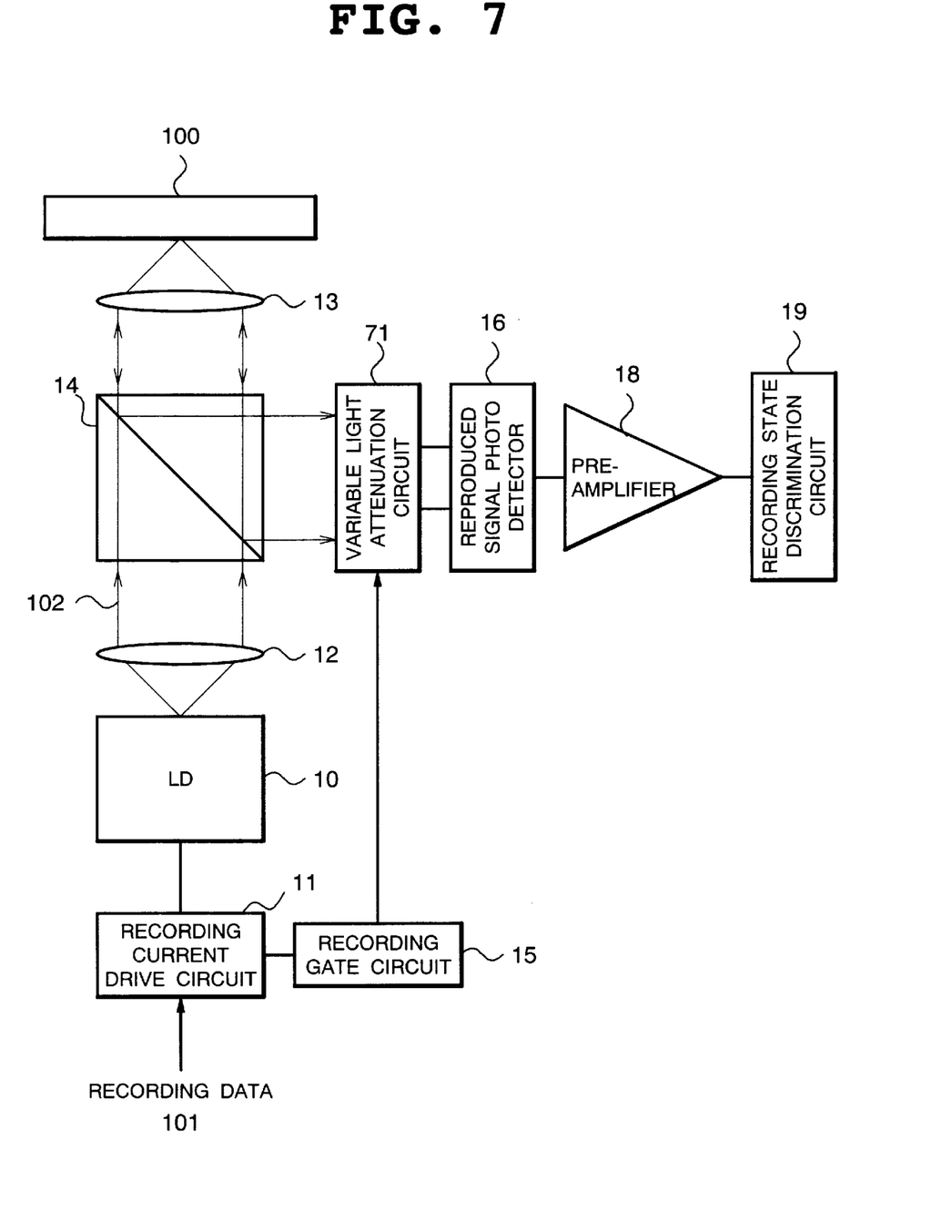
FIG. 7 is a block diagram showing structure of a fourth embodiment of an optical disk recording device according to the present invention.
Figure 8:
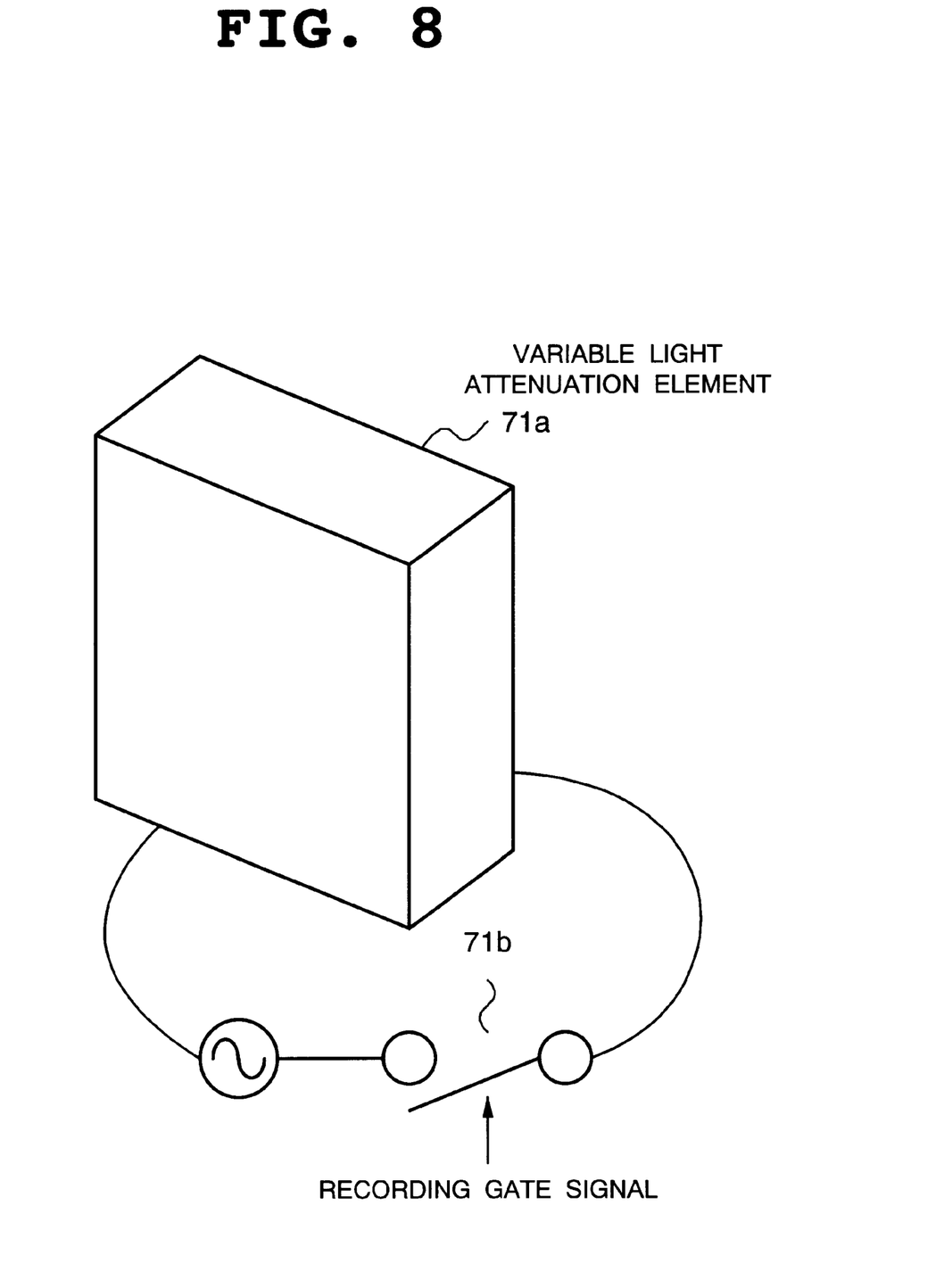
FIG. 8 is a diagram showing an example of structure of a variable optical element in the fourth embodiment of the present invention.

FIG. 7 is a diagram showing structure of a fourth embodiment of the present invention. With reference to FIG. 7, the fourth embodiment of the present invention is structured with a variable light attenuation circuit 71 responsive to the application of a recording gate signal at information recording for reducing the amount of transmitted light disposed in an optical path of an optical system which leads a recording signal to the reproduced signal photo detector 16. In FIG. 7, a component assigned a reference numeral common to that of the embodiment in FIG. 1 represents the same component as its counterpart in the embodiment of FIG. 1. FIG. 8 is a diagram showing one example of structure of the variable light attenuation circuit 71 in the fourth embodiment of the present invention. Here, the variable light attenuation circuit 71 is composed of a light attenuation element 71a and a switch 71b for turning on the light attenuation element 71a by means of a recording gate signal.

Light transmittance of this variable light attenuation circuit 71 is set in advance such that the amount of light incident on the reproduced signal photo detector 16 attains a level at which no saturation of output of the pre-amplifier 18 will occur.

The variable light attenuation circuit 71 enters the ON state in recording operation upon receiving input of a recording gate signal (Gate) from the recording gate circuit 15 and when the amount of light incident on the variable light attenuation circuit 71 is increased, the circuit 71 lowers the light transmittance to reduce the amount of light incident on the reproduced signal photo detector 16. This prevents saturation of output of the pre-amplifier 18 to enable precise detection of a reproduced signal being recorded.

As a light attenuation element of the variable light attenuation circuit 71, an element which can vary the amount of transmitted light according to an applied voltage can be used such as a liquid crystal element or an electronic shutter element. Any other element can be used that can vary the amount of transmitted light according to an applied voltage.

As described in the foregoing, provision of the variable light attenuation circuit 71 which makes the amount of light incident on the reproduced signal photo detector constant allows the present embodiment to eliminate the need of using another photo detector and to make a signal output from the reproduced signal photo detector constant with ease even when laser power is increased while the recording gate circuit 15 is open, thereby enabling detection of a reproduced signal output from the photo detector when laser power is increased while the recording gate circuit is open.

Although in each of the foregoing embodiments, description has been made of a case where a pre-amplifier is a DC amplifier, it is clearly understood that each embodiment is also applicable to an AC amplifier.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An optical disk recording device for conducting reading and recording of data through irradiation of laser beam on an optical disk medium, comprising:

a photodetector which receives input of reflected light from said optical disk medium and which outputs a reproduced signal based on the input of reflected light;

an amplifier which amplifies the reproduced signal from the photodetector and which outputs an amplified reproduced signal for monitoring; and a reduction element which lowers a magnitude of the reproduced signal reaching the amplifier in response to an increase of the reflected light amount during a data recording operation, such that no saturation of the amplifier output occurs.

2. The device of claim 1, wherein the reduction element comprises a level shift circuit which:

receives the reproduced signal from the photodetector;

shifts a level of a direct current component of the reproduced signal down to a preset value in response to the increase of the reflected light amount;

and outputs the level-shifted reproduced signal to the amplifier, such that no saturation of the amplifier output occurs.

3. The device of claim 2, further comprising:

a recording gate circuit which outputs a recording gate signal indicative of on-recording of data, wherein said level shift circuit shifts the level of the direct current component of the reproduced signal down to the preset value upon receiving input of a recording gate signal from said recording gate circuit.

4. The device of claim 3, wherein the level shift circuit comprises a shunt circuit which is turned on and off in response to a recording gate signal at data recording, and which shunts the reproduced signal from the photodetector to shift the level of the direct current component of said reproduced signal.

5. The device of claim 4, wherein said shunt circuit comprises a current mirror circuit containing a first transistor having a collector and a base connected with each other and the collector connected to said recording gate circuit and a second transistor having a collector connected to the output of said photodetector and the input of said amplifier.

6. The device of claim 4, wherein said shunt circuit comprises:

a FET having a drain connected to the output of said photodetector and the input of said amplifier and a gate connected to said recording gate circuit;

and a resistor for dividing a voltage.

7. The device of claim 6, wherein said FET is a J-FET or a MOS-FET.

8. The device of claim 2, wherein said amplifier is built in said photodetector.

9. The device of claim 1, wherein the reduction element comprises a gain control circuit which:

receives the reproduced signal from the photodetector;

shifts a gain of a signal amplitude of the reproduced signal down to a preset value in response to an increase of the reflected light amount;

and outputs the gain-shifted reproduced signal to the amplifier, such that no saturation of the amplifier output occurs.

10. The device of claim 9, further comprising:

a recording gate circuit which outputs a recording gate signal indicative of on-recording of data, wherein said gain control circuit shifts the gain of the signal amplitude of the reproduced signal down to the preset value upon receiving input of a recording gate signal from said recording gate circuit.

11. The device of claim 1, wherein the reduction element comprises a subtraction circuit which:

receives the reproduced signal from the photodetector;

subtracts a part of a direct current component, proportional to the increase in the amount of reflected light, from the direct current component of the reproduced signal in response to an increase of the reflected light amount; and outputs the subtracted reproduced signal to the amplifier, such that no saturation of the amplifier output occurs.

12. The device of claim 11, further comprising:

a recording gate circuit which outputs a recording gate signal indicative of on-recording of data, wherein said subtraction circuit subtracts the part of the direct current component upon receiving input of a recording gate signal from said recording gate circuit.

13. The device of claim 1, wherein the reduction element comprises a light attenuation element which:

attenuates an amount of reflected light input to said photodetector in response to an increase of the reflected light amount, such that no saturation of the amplifier output occurs due to the reduction signal transmitted from the photodetector to the amplifier.

14. The device of claim 13, further comprising:

a recording gate circuit which outputs a recording gate signal indicative of on-recording of data, wherein the light attenuation element attenuates the amount of light upon receiving input of a recording gate signal from said recording gate circuit.

15. The device of claim 14, wherein the light attenuation element comprises a liquid crystal element or an electronic shutter element.

16. An optical disk recording device for conducting reading and recording of data through irradiation of laser beam on an optical disk medium, comprising:

a photodetection means for receiving input of reflected light from said optical disk medium and for outputting a reproduced signal based on the input of reflected light;

an amplification means for amplifying the reproduced signal from said photodetection means and for outputting the amplified reproduced signal for monitoring; and a first means for lowering a magnitude of the reproduced signal reaching the amplification means in response to an increase of the reflected light amount during data recording operation, such that no saturation of the amplification means output occurs.

17. The device of claim 16, further comprising a recording gate means for outputting a recording gate signal indicative of on-recording of data, wherein the first means lowers the magnitude of the reproduced signal upon receiving input of a recording gate signal from said recording gate means.

18. The device of claim 17, wherein the first means comprises a level shift means for receiving the reproduced signal from the photodetection means, for shifting a level of a direct current component of the reproduced signal down to a preset value and for outputting the level-shifted reproduced signal to the amplification means, such that no saturation of the amplification means output occurs.

19. The device of claim 17, wherein the first means comprises a gain control means for receiving the reproduced signal from the photodetection means, for shifting a gain of a signal amplitude of the reproduced signal down to a preset value in response to an increase of the reflected light amount and for outputting the gain-shifted reproduced signal to the amplification means, such that no saturation of the amplification means output occurs.

20. The device of claim 17, wherein the first means comprises a subtraction means for receiving the reproduced signal from the photodetector, for subtracting a part of the direct current component, proportional to the increase in the amount of reflected light, from the direct current component of the reproduced signal in response to an increase of the reflected light amount and for outputting the subtracted reproduced signal to the amplification means, such that no saturation of the amplification means output occurs.

21. The device of claim 17, wherein the first means comprises a light attenuation means for attenuating the amount of reflected light input to said photodetection means in response to an increase of the reflected light amount, such that no saturation of the amplification means output occurs due to the reduction signal transmitted from the photodetection means to the amplification means.

22. A method of conducting recording of data, comprising:

irradiating a laser beam on an optical disk medium to record data on the optical disk medium;

detecting reflected light from said optical disk medium;

outputting a reproduced signal based on the detected reflected light;

amplifying the reproduced signal;

outputting the amplified reproduced signal for monitoring; and prior to the step of amplifying the reproduced signal, lowering a magnitude of the reproduced signal in response to an increase of the reflected light amount during the data recording operation, such that no saturation of the amplified reproduced signal occurs.

23. The method of claim 22, further comprising outputting a recording gate signal indicative of on-recording of data, wherein the step of lowering the magnitude of the reproduced signal occurs in response to the recording gate signal.

24. The method of claim 23, wherein the step of lowering the magnitude of the reproduced signal comprises one of:

a) shifting a level of a direct current component of the reproduced signal down to a preset value;

b) shifting a gain of a signal amplitude of the reproduced signal down to a preset value;

c) subtracting a part of the direct current component, proportional to the increase in the amount of reflected light, from the direct current component of the reproduced signal; and d) attenuating the amount of reflected light, such that no saturation of the amplified reproduced signal occurs.

25. The method of claim 22, wherein the step of monitoring comprises a step of data recording verification.

* * * * *